United States Patent
Lee

(10) Patent No.: US 9,658,989 B2
(45) Date of Patent: May 23, 2017

(54) APPARATUS AND METHOD FOR EXTRACTING AND MANIPULATING THE READING ORDER OF TEXT TO PREPARE A DISPLAY DOCUMENT FOR ANALYSIS

(75) Inventor: Adrian Lee, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1436 days.

(21) Appl. No.: 12/197,860

(22) Filed: Aug. 25, 2008

(65) Prior Publication Data
US 2009/0063965 A1    Mar. 5, 2009

(30) Foreign Application Priority Data
Sep. 3, 2007  (GB) .................................. 0717067.3

(51) Int. Cl.
| G06F 17/00 | (2006.01) |
| G06F 17/22 | (2006.01) |
| G06F 17/28 | (2006.01) |
| G06F 9/44 | (2006.01) |
| G06F 17/27 | (2006.01) |

(52) U.S. Cl.
CPC ...... G06F 17/2223 (2013.01); G06F 17/2863 (2013.01); *G06F 9/4448* (2013.01); *G06F 17/275* (2013.01)

(58) Field of Classification Search
CPC ............ G06F 17/2223; G06F 17/2863; G06F 17/275; G06F 17/2217; G06F 9/4448
USPC ......... 715/255–256, 264–265; 707/705, 736, 707/E17.001; 704/1–10, 251, 270.1; 382/173–180
See application file for complete search history.

(56) References Cited

U.S. PATENT DOCUMENTS

| 4,203,102 A * | 5/1980 | Hydes ........................... 345/467 |
| 5,454,046 A * | 9/1995 | Carman, II ................... 382/186 |
| 5,784,069 A * | 7/1998 | Daniels et al. ............... 345/467 |
| 5,812,122 A * | 9/1998 | Ng ................................ 715/703 |
| 6,047,251 A * | 4/2000 | Pon ...................... G06K 9/6807 382/229 |
| 6,204,782 B1 * | 3/2001 | Gonzalez et al. ............. 341/90 |

(Continued)

FOREIGN PATENT DOCUMENTS

| JP | 2000-250515 A1 | 9/2000 |
| WO | 01/82126 A2 | 11/2001 |

OTHER PUBLICATIONS

Dhahya D. et al.,"Script Identification in Printed Bilingual Documents," © Feb. 2002, Sadhana vol. 27, Part 1, pp. 73-82.*
Peake, G.S. et al.,"Script and Language Identification from Document Images," © 1997, IEEE, pp. 10-17.*
Tan, T.N.,"Written Language recognition Based on Texture Analysis," ©1996, IEEE, pp. 185-188.*
Dhahya D. et al,"Word Level Script Identification in Bilingual Documents through Discriminating Features," Signal Processing, Communications and Networking, 2007, ICSCN '07, ©, Feb. 22-24, 2007, pp. 630-635.*

(Continued)

*Primary Examiner* — Cesar Paula
*Assistant Examiner* — James H Blackwell
(74) *Attorney, Agent, or Firm* — Steven L. Nichols; Fabian VanCott

(57) ABSTRACT

A method for preparing a display document for analysis includes: extracting character data from the display document; determining a first order associated with processing of the character data and a second order associated with a logical order of the character data; determining whether the first order is different from the second order; and reversing at least a portion of the character data in response to the determination that the first order is different from the second order.

23 Claims, 5 Drawing Sheets

(56) References Cited

U.S. PATENT DOCUMENTS

| | | | | |
|---|---|---|---|---|
| 6,216,102 | B1* | 4/2001 | Martino | G06F 17/2715 704/1 |
| 6,493,735 | B1* | 12/2002 | Kumhyr | 715/236 |
| 6,513,002 | B1* | 1/2003 | Gillam | 704/9 |
| 6,668,085 | B1* | 12/2003 | Evans | G06K 9/222 382/229 |
| 6,910,185 | B1* | 6/2005 | Schwartz | 715/205 |
| 6,944,820 | B2* | 9/2005 | Feinberg | 715/256 |
| 6,993,716 | B2* | 1/2006 | Palmieri | 715/265 |
| 7,139,697 | B2* | 11/2006 | Hakkinen | G06F 17/2715 704/8 |
| 7,283,949 | B2* | 10/2007 | Shieh | 704/4 |
| 7,506,255 | B1* | 3/2009 | Feinberg et al. | 715/264 |
| 7,508,984 | B2* | 3/2009 | Ohguro | 382/181 |
| 7,689,409 | B2* | 3/2010 | Heinecke | 704/9 |
| 7,831,908 | B2* | 11/2010 | Danilo | 715/245 |
| 8,185,376 | B2* | 5/2012 | Chu | G06F 17/275 704/8 |
| 2004/0039996 | A1* | 2/2004 | Flam | 715/536 |
| 2004/0199373 | A1* | 10/2004 | Shieh | 704/2 |
| 2004/0225967 | A1* | 11/2004 | Hassanin et al. | 715/760 |
| 2004/0249627 | A1* | 12/2004 | Mirkin | 704/3 |
| 2004/0260536 | A1* | 12/2004 | Hwang | G06F 17/275 704/9 |
| 2005/0183033 | A1* | 8/2005 | Feinberg et al. | 715/809 |
| 2006/0106593 | A1* | 5/2006 | Schultz et al. | 704/5 |
| 2006/0184357 | A1* | 8/2006 | Ramsey et al. | 704/9 |
| 2008/0262830 | A1* | 10/2008 | Flam | 704/8 |
| 2008/0304719 | A1* | 12/2008 | Winkler | 382/119 |

OTHER PUBLICATIONS

Shaikli, Nadim et al.; "Re: yudit + bidi"; arabeyes.org, [Online]; Jun. 3, 2002; URL:http://lists.arabeyes.org/archives/developer/2002/June/msg00002.html> [retrieved on Mar. 18, 2009]; pp. 1-2.

Gidaii, Israel; "Complex—Text Languages—An Overview"; Open Group, [Online]; Sep. 5, 2005; Retrieved from the Internet: URL:http://web.archive.org/web/20050905235220/http://www.opengroup.org/onlinepubs/9638399/overview.htm> [retrieved on Mar. 18, 2009]; section "Aspects of Bidirectional Language Writing Systems" pp. 1-23.

Atkin, Steven et al.; "Implementations of Bidirectional Reordering Algorithms"; Technical Report—Florida Institute of Technology—Departement of Computer Sciences, [Online]; Oct. 4, 2000; Retrieved from the Internet: URL:https://www.cs.fit.edu/Projects/tech_reports/tr2000.html> [retrieved on Mar. 18, 2009]; pp. 1-10.

Ishida, Richard: "What you need to know about the bidi algorithm and inline markup"; W3C—Word Wide Web Consortium, [Online]; Dec. 3, 2006; Retrieved from the Internet: URL:http://www.w3.org/International/articles/inline-bidi-markup/> [retrieved on Mar. 18, 2009]; section "Visual vs logical order"; pp. 1-13.

Ishida, Richard; "Internationalization Best Practices: Handling Right-to-left Scripts in XHTML and HTML Content"; W3C—Word Wide Web Consortium, [Online]; Jun. 6, 2007; Retrieved from the Internet: URL: http://www.w3.org/TR/i18n-html-tech-bidi/> [retrieved on Mar. 18, 2009] pp. 1-25.

W3C, Internationalization Best Practices: Handling Right-to-left Scripts in XHTML and HTML Content, Copyright 2007, all pages.

* cited by examiner

APPARATUS AND METHOD FOR EXTRACTING AND MANIPULATING THE READING ORDER OF TEXT TO PREPARE A DISPLAY DOCUMENT FOR ANALYSIS

BACKGROUND OF THE INVENTION

Aspects of the present invention relate to preparing a display document for analysis, and, more specifically, to an apparatus and method for extracting and manipulating text order to prepare a display document for analysis.

A display document, such as a Portable Document Format (PDF) document, is a document which is primarily intended to convey content visually to a user. In many cases, the display document may be graphical in nature or may have a combination of graphical and textual structures. Text associated with a display document is extracted from the document prior to text analysis being performed. It is desirable for the extracted text to be in logical (i.e. reading) order prior to text analysis being performed. Some document formats, particularly those that are intended for display purposes (e.g. PDF), display text in left-to-right (LtR) order regardless of whether a language associated with the text has an associated LtR logical order (e.g. English) or right-to-left (RtL) logical order (e.g. Arabic). If text is associated with an RtL logical order and an associated document is displayed in an LtR order, current text extraction tools extract the text in the displayed order (e.g. LtR order). Thus, the extracted text is not suitable for text analysis because the text is in a (reversed) LtR order.

BRIEF SUMMARY OF THE INVENTION

A method for preparing a display document for analysis includes: extracting character data from the display document; determining a first order associated with processing of the character data and a second order associated with a logical order of the character data; determining whether the first order is different from the second order; and reversing at least a portion of the character data in response to the determination that the first order is different from the second order. An apparatus for preparing a display document for analysis comprising: an extractor for extracting character data from the display document; an order identifier for determining a first order associated with processing of the character data and a second order associated with a logical order of the character data, and for determining whether the first order is different from the second order; and a reverse component for reversing at least a portion of the character data, responsive to the order identifier determining that the first order is different from the second order.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

Figure 1:
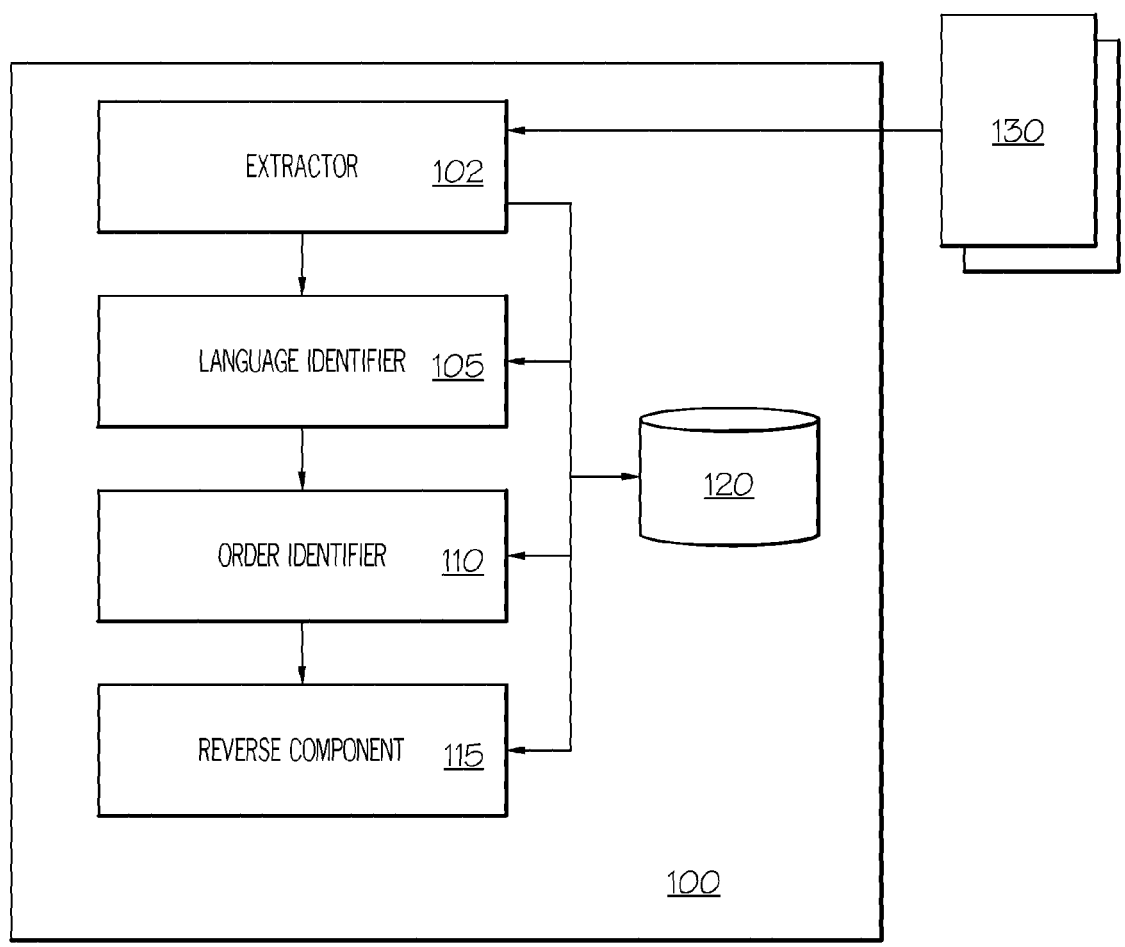
FIG. 1 is a block diagram of one illustrative embodiment of an apparatus for preparing a display document for subsequent analysis, according to one embodiment of principles described herein.

As discussed above, a display document may contain text or character data which represent one or more languages. The display document presents the character data sequentially in a presentation order. This presentation order may or may not be the logical order (reading order) of the characters. For example, for a particular document format the presentation order may be from LtR and from the top to the bottom of the page. For most Indo-European languages, this presentation order corresponds to the logical order of the characters. However, for other languages, such as Arabic and Eastern languages, this presentation order may not correspond to the logical order of the characters. Where the presentation order and the logical order are different, the character strings extracted from the document can be garbled.

To more fully exploit the textual content of the display document, it can be desirable to extract and correctly order the character data. For example, correctly ordered character data can be useful in performing text analysis, modification of the display document by word processing system, and storing the information contained in the display document in a database. The figures and text below describe an illustrative apparatus and methods for extracting character data from a display document and correctly ordering the character data.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows one illustrative embodiment of apparatus (100) for preparing a display document (130) for analysis. According to one illustrative embodiment, the apparatus (100) is comprised of an extractor (102), a language identifier (105), an order identifier (110), a reverse component (115) and a storage component (120).

The extractor (102) extracts text associated with the display document (130). According to one embodiment, the extractor (102) extracts the text in a preprocessing step and stores the extracted text. In one example, a processing order is determined by the extractor. The processing order is the start to end sequence of the text in the data file. In one embodiment, the default processing order is in an LtR order. The language identifier (105) accesses the extracted text to identify the language in which the text was written. The order identifier (110) identifies the current order of the text. For example, the order identifier (110) may conclude, based on the language and the processing order, that the text order is reversed. The order identifier (110) then passes this information to the reverse component (115). The reverse component (115) reverses the order of the text if required.

Figure 2:
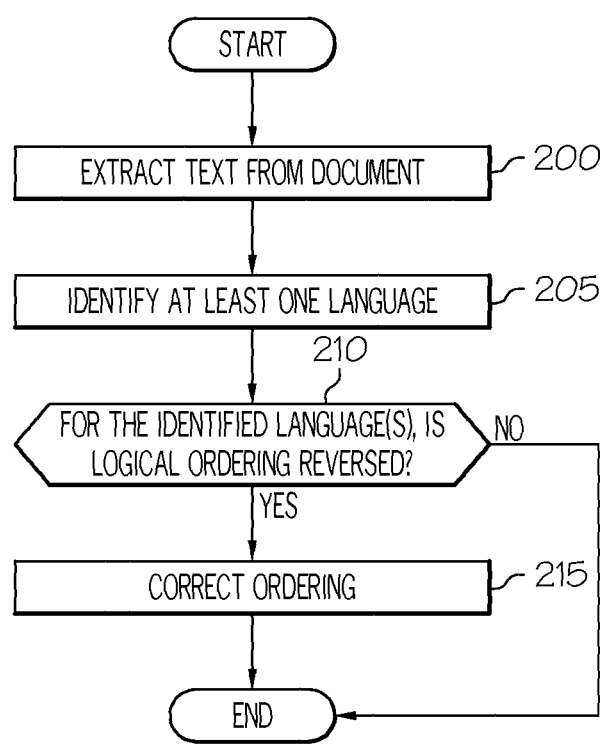
FIG. 2 is a flowchart of an illustrative method for preparing a display document for subsequent analysis, according to one embodiment of principles described herein.

FIG. 2 is a high level flowchart showing the overall method for preparing a display document for analysis. In a first step, text is extracted from the document (step 200). The extracted text then is analyzed by the language identifier (105) to identify at least one language (step 205). Additional detail about the step of identifying languages within the extracted text is given in FIG. 3. The language identifier (105) communicates the languages it has identified to the order identifier (110). The order identifier (110) determines if any portion of the text is in reverse logical order (determination 210). Additional detail about an illustrative process followed by the order identifier (110) is given in FIG. 4 and the accompanying portions of the specification. If none of the text is in reverse logical order, the preparation for analysis of the text extracted from the display document is complete and the process shown in FIG. 2 ends. If portions of the text are in reverse logical order, this information is communicated to the reverse component (115). The reverse component (115) then corrects the reversed portions of the text to produce a body of text that is in logical order. Additional details about an illustrative method for correcting the reversed portions of the text are given in FIG. 5. The preparation of the text is then complete and the process ends.

Figure 3:
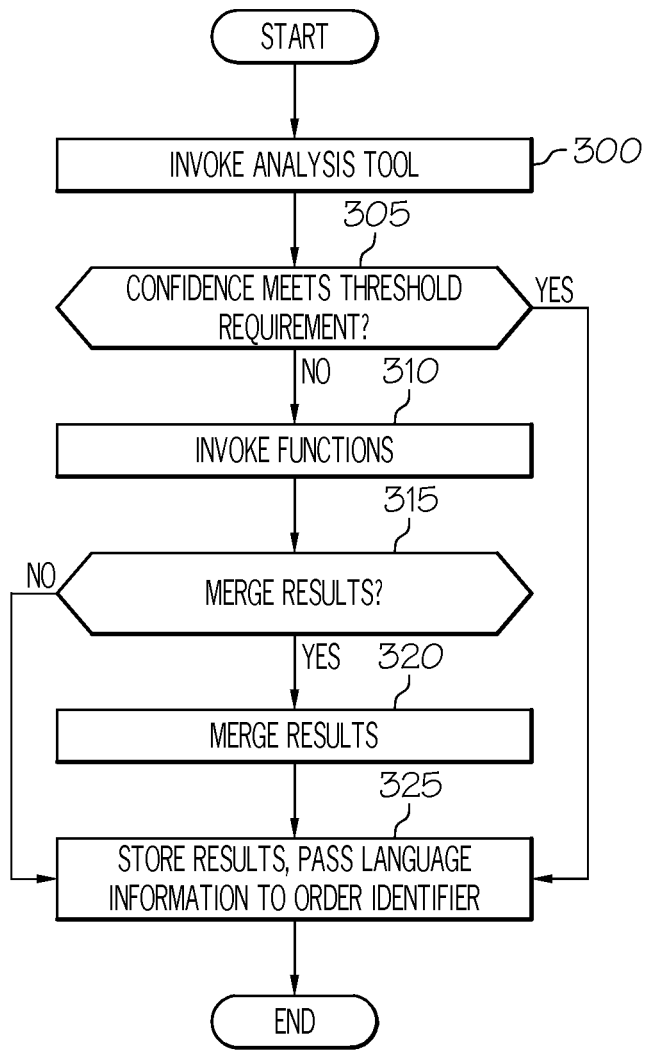
FIG. 3 is a flowchart of an illustrative method for identifying the language represented by characters contained within a display document, according to one embodiment of principles described herein.

FIG. 3 is a flowchart of an illustrative method for determining the languages contained within the text extracted from a display document. According to one embodiment, the language identifier (105) performs the steps illustrated in FIG. 3. In a first step, the language identifier (105) may invoke an analysis tool such as International Business Machine's LanguageWare™. In one embodiment, the analysis tool analyses the extracted text according to a processing order. A processing order indicates the directional progression of analysis from a starting point to an ending point. The analysis tool may first use an LtR processing order. According to one illustrative embodiment, the analysis tool compares segments of the text against a set of dictionaries, where each dictionary is associated with a particular language. In response to matches between dictionary entries and the extracted text, the analysis tool determines which language or languages are present in the extracted text. If the analysis tool is not able to determine a language, the extracted text is reversed and input to the analysis tool. The analysis tool then repeats the comparison process with the reversed text. By reversing the text, matches between the languages which have a RtL word order (such as Arabic) can be made. After finding one or more matches between a language and various text segments, the analysis tool generates a confidence value for the match. According to one embodiment, the confidence value generated by the analysis tool uses statistical data produced during the language identification process. This confidence value is communicated by the analysis tool to the language identifier (105).

The language identifier (105) then compares the confidence value to pre-configurable confidence threshold (determination 305). If the provided confidence value meets or exceeds the confidence threshold, the language results are stored and/or communicated to the order identifier (step 325). If the confidence value does not meet the confidence threshold, the language identifier may then invoke one or more functions (step 310). By way of example and not limitation, a first function may analyze various encoding schemes for text characters. For example, common encoding scheme include ISO 8859 or UTF-16 (Unicode). An encoding scheme can have a language explicitly associated with it. For example, ISO 8859-6 is an encoding scheme for Arabic. Other encoding schemes, such as Unicode, can support multiple languages. Using an encoding scheme, each character of each language is assigned a unique number within the encoding scheme.

In one illustrative embodiment, invokes the first function analyzes the character encoding of the extracted text against a knowledge database. The knowledge database maps the character encodings into a language. In response to the mapping, the first function returns data identifying the language and an associated confidence value.

According to one embodiment, if the first function returns results which are ambiguous or indicates the possibility that the text could be two or more languages, the language identifier (105) invokes a second function. The second function may compare the character encodings of the extracted text against a second knowledge base. The second knowledge maps the character encodings with a script. For example, two languages may have different scripts, thereby allowing the second function to accurately discriminate between the two languages. In response to the comparison, the second function determines a result that associates a language with the extracted text and a confidence value associated with the result.

If the confidence values received from the analysis tool and functions do not meet the pre-configurable confidence threshold, the language identifier determines if the results should be merged (determination 315). According to one embodiment, merging the results allows for the combination of the confidence values from the various tools and functions, potentially resulting in a higher overall confidence level. If the results are not merged, the results are stored and the language information is passed to order identifier. If language identifier determines that it is advantageous to merge the results, the results are merged (step 320) and the language identifier process ends.

Figure 4:
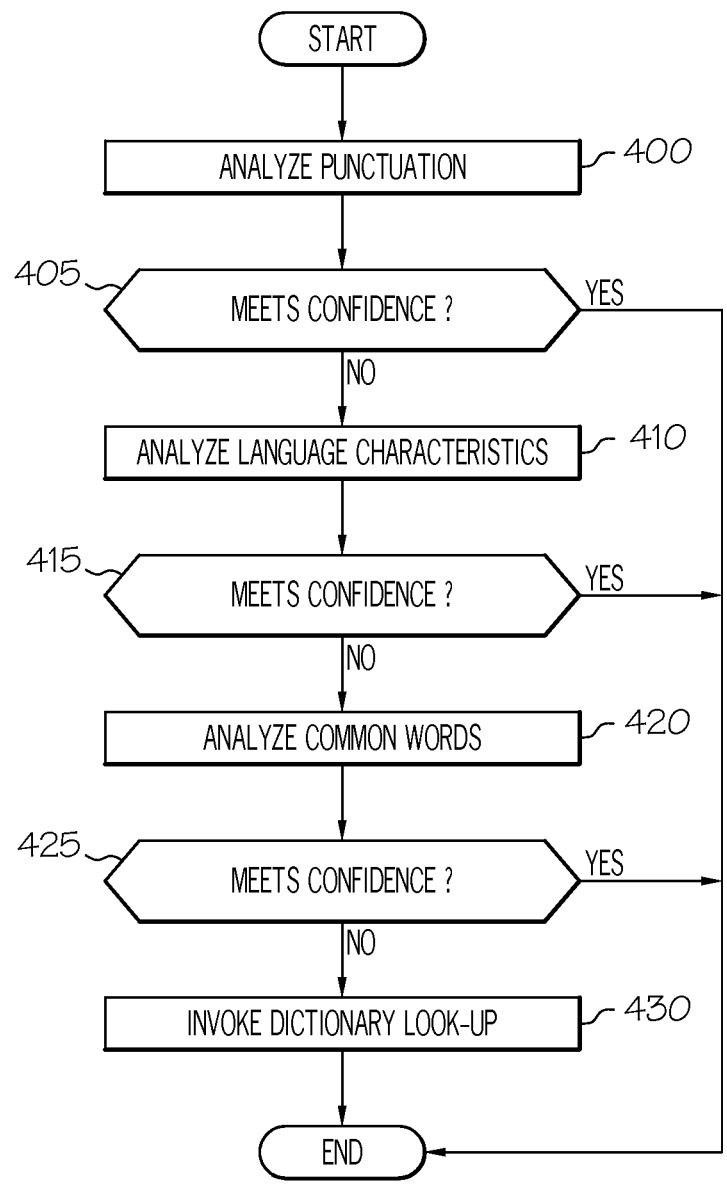
FIG. 4 is a flowchart showing an illustrative method for determining the logical order of character data extracted from a display document, according to one embodiment of principles described herein.

FIG. 4 is a flowchart showing an illustrative method for determining the logical order of extracted text. According to one embodiment, the order identifier (110) receives the language information from the language identifier (105) and obtains the extracted text. For example, the language information passed to the order identifier may indicate that there are two languages within the text, either in combination or in various segments of the text. In a first example, the result comprises: English and Arabic.

As discussed above with reference to FIG. 2, at step 205, the order identifier (110) determines whether a logical order is reversed in the extracted text, that is, whether the logical order is reversed with respect to the processing order.

In one example, the previously described analysis tool or one or more functions may be able to determine whether a logical order is reversed in the extracted text. For example, if the extracted text having a logical order (e.g. RtL) that is reversed (e.g. LtR) is input to the analysis tool, the analysis tool will not be able to determine a language. However, if (e.g. a subset of) the extracted text is reversed and input to the analysis tool, the analysis tool is more likely to determine a language (e.g. Arabic).

However, if a determination as to whether a logical order is reversed in the extracted text is not made with the desired level of confidence, the process of FIG. 4 is executed. In FIG. 4, at step 400, the order identifier (110) analyses punctuation associated with the extracted text. For example, the extracted text may comprise the following subset. It should be understood that the extracted text comprises text having LtR logical order (e.g. "cows drink water.") and text having RtL logical order (e.g. ".doof emos tae stac eht"). It should be understood that the text having RtL logical order represents Arabic text in the examples herein. It should be understood that capital letters have not been used in the example below:

cows drink water. .doof emos tae stac eht

First, the order identifier (110) processes the extracted text in LtR order. In response, the order identifier (110) identifies characters associated with punctuation (e.g. position dependent characters) (step 400). With reference to the above text, the order identifier (110) identifies a first full stop ("."). In response to identifying a punctuation character, the order identifier (110) identifies a character on either side of the punctuation character. In the example above, the order identifier (110) identifies an alphabetical character (e.g. "r") to the left hand side of the full stop and a space character to the right hand side of the full stop. Thus, the order identifier (110) identifies a set comprising the following types of characters in LtR order:

[alphabetical character] [punctuation character] [space character]

The order identifier (110) continues to analyze the text and identifies a second full stop ("."), a space character to the left hand side of the full stop, and an alphabetical character (e.g. "d") to the right hand side of the full stop. Thus, the order identifier (110) identifies a set comprising the following types of characters in LtR order:

[space character] [punctuation character] [alphabetical character]

According to one embodiment, the order identifier (110) compares various patterns and sets discovered within the text against a first set of rules stored in the first storage component (120). According to one illustrative embodiment, a rule maps data associated with punctuation character usage with a logical order and an indication as to whether the logical order is reversed in the extracted text.

An example of a rule is shown below. The rule is associated with a format wherein a punctuation character typically occurs at the logical end of a word, regardless of whether text has an LtR logical order or an RtL logical order:

```
if:
    [space character] [punctuation character] [alphabetical character]
then:
    logical order = RtL; order = reverse
if:
    [alphabetical character] [punctuation character] [space character]
then:
    logical order = LtR
```

In response to comparison against the rule, the order identifier (110) generates a result indicating that the one segment of the text has a logical order of LtR and another segment of the text has a logical order of RtL. The application of the rule also indicates that the RtL logical order is reversed in the extracted text.

According to one illustrative embodiment, the order identifier (110) also provides in the result an indication of the number of occurrences of text having an LtR logical order and text having an RtL logical order. In the first example, the order identifier (110) indicates one occurrence of text having an LtR logical order (e.g. the first punctuation character) and one occurrence of text having an RtL logical order (e.g. the second punctuation character).

According to one illustrative embodiment, the order identifier (110) determines an associated confidence value associated with the result and determines (step 405) whether the confidence value meets a pre-configurable confidence threshold. If the provided confidence value meets the pre-configurable confidence threshold, the result is stored. If the logical order of at least a sub-set of the extracted text is reversed, the order identifier (110) passes the result to the reverse component (115). If the logical order of at least a sub-set of the extracted text is not reversed, the result is stored and the text is then prepared for analysis.

However, if the desired level of confidence is not obtained by punctuation analysis, the process proceeds to analyze language characteristics (step 410). According to one illustrative embodiment, the language identifier (105) has passed the language information to the order identifier (110) which can then leverage this information to better select a rule or set of rules (e.g. a rule associated with English) against which to compare extracted text. Thus, a rule associated with characteristics of a particular language can be selected and thereby improve the accuracy of the result determined by the order identifier (110).

In another example of analysis of language characteristics, the analysis of presentation data associated with a character can be used. For example, a character in some languages such as Arabic has, as well as a character encoding, an encoding associated with a presentation form. For example, in Arabic script, a character placed at the beginning of a word may have a different shape that the same character at the middle or end of the word. Consequently, this character is encoded differently depending on where it occurs in a word (e.g. in the middle of a word ("medial"); at the beginning of a word ("initial"); at the end of a word ("final") or in isolation ("isolated")).

This allows the order identifier (110) to distinguish between the beginning and end of a word by examining the encoding of characters with position dependent encoding, thereby determining the order in which the text is presented. For example, the presentation data associated with a first character may comprise "initial." The order identifier (110) determines characters on either side of the first character. In an example, a character to the left hand side is an alphabetical character and a character to the right hand side is a space character. The order identifier (110) compares the types of characters (e.g. [alphabetical character] [initial] [space character]) found against a rule. According to one illustrative embodiment, a rule maps data associated with presentation data with a logical order and an indication as to whether the logical order is reversed in the extracted text.

An example of an illustrative rule is shown below. The rule is associated with a format wherein an initial character typically has a space character to the left hand side and an alphabetical character to the right hand side:

```
if:
    [alphabetical character] [initial] [space character]
then:
    logical order = RtL; order = reverse
```

In response to a comparison based on the rule, the order identifier (110) generates a result indicating that the text comprises a logical order of RtL and that the RtL logical order is reversed in the extracted text. Consequently, such a mechanism can exploit the fact that particular languages (e.g. Arabic) can have a character that is presented differently depending on where the character occurs in a word.

If the resulting confidence value does not meet the pre-configurable confidence threshold, the order identifier (110) then proceeds to analyze commonly occurring words in the extracted text (step 420). For example, the order identifier (110) may access a set of commonly occurring words (e.g. words that are commonly occurring in multiple languages) stored in the first storage component (120). According to one illustrative embodiment, a commonly occurring word such as "the" is stored in LtR logical order (e.g. "the") and the reversed logical order (e.g. "eht"). For example, an identifier may be associated with a logical order is associated with the commonly occurring word. In one embodiment, an indication associated with whether a logical order is reversed in the extracted text is also associated with the commonly occurring word. An example is shown below:

```
"the"; logical order=LtR
"eht"; order = reversed logical order
```

According to one exemplary embodiment, a commonly occurring word is stored with a space character on either side of the boundary characters. For example, "the" is stored as "the". This ensures that the order identifier (110) does not find occurrences of the commonly occurring word within another word. For example, the order identifier (110) will not find "the" within "other".

According to one illustrative embodiment, a first word which when reversed is a different second word, is not used (e.g. "room" when reversed is "moor"). This is because the order identifier (110) will not be able to distinguish between an occurrence of the first word which has been reversed and an occurrence of the different second word. However, if such words are used the order identifier (110) may invoke a grammatical analysis to distinguish between an occurrence of the first word which has been reversed and an occurrence of the different second word.

The order identifier (110) processes the extracted text in LtR logical order and checks it for one or more commonly occurring words stored in LtR logical order and reversed logical order. With reference to the above text, the order identifier (110) identifies "eht". In response, the order identifier (110) uses the data stored with the occurrence of the commonly occurring word in order to determine a result indicating that a logical order is reversed in the extracted text.

According to one illustrative embodiment, the order identifier (110) also provides in the result an indication of the number of occurrences of text having an LtR logical order and text having a reversed logical order. In the first example, the order identifier (110) indicates one occurrence of text having a reversed logical order (e.g. the commonly occurring word "eht").

In one embodiment, the order identifier (110) determines an associated confidence value associated with the result and determines (step 425) whether the confidence value meets a pre-configurable confidence threshold. If the provided confidence value meets the pre-configurable confidence threshold, the result is stored and the order information may be passed to the reverse component (115) if necessary. For example, if the logical order of at least a sub-set of the extracted text is reversed in the extracted text, the order identifier (110) passes the result to the reverse component (115) and step 210 of FIG. 2 is executed. If the logical order of at least a sub-set of the extracted text is not reversed in the extracted.

If the provided confidence value generated by step 420 does not meet the pre-configurable confidence threshold, the order identifier (110) invokes a look-up of one or more dictionaries (step 430). For example, the previous steps may not have produced results meeting the confidence threshold because the extracted text is associated with a specialized document type (e.g. a patent specification; a computer technology-related document). According to one illustrative embodiment, a dictionary comprises a word stored in LtR logical order and reversed logical order, an identifier associated with a logical order and an indication associated with whether a logical order is reversed in the extracted text.

Alternatively, a word associated with an LtR logical order can be input to the dictionary and if the dictionary is not able to determine a result, the word is reversed and input to the dictionary. In response, typically, the dictionary is more likely to determine a result. Consequently, this results in the dictionary having to store less data.

According to one illustrative embodiment, in response to step 430, the order identifier (110) determines a result indicating whether there is text having an LtR logical order, text having an RtL logical order, whether a logical order is reversed in the extracted text and an indication of the number of occurrences of LtR logical order and RtL logical order. The result can then be stored and the process of FIG. 4 ends.

If the logical order of at least a sub-set of the extracted text is reversed in the extracted text, the order identifier (110) passes the result to the reverse component (115) and step 210 of FIG. 2 is executed. If the logical order of at least a sub-set of the extracted text is not reversed in the extracted text, the process of FIG. 2 ends. According to one illustrative embodiment, look-up of one or more dictionaries is used after one or more of the previous mechanisms, because increased processing and time is required for look-ups. In one example, look-up of one or more dictionaries is used in accordance with the confidence values associated with the previous mechanisms. It should be understood that any number of other mechanisms can be executed in order to determine a result indicating whether there is text having an LtR logical order, having an RtL logical order, whether a logical order is reversed in the extracted text and an indication of the number of occurrences of LtR logical order and RtL logical order. According to one embodiment, the dictionary and/or the analysis mechanism is preferably selected based on the language determination made by the language identifier. This allows language specific grammar, vocabulary, and characters to leveraged in determining the logical order of the extracted text. As mentioned above, the order identifier (110) determines that the logical order is reversed in the extracted text, and step 210 of FIG. 2 is executed, wherein the reverse component (115) reverses one or more text portions associated with the extracted text.

Figure 5:
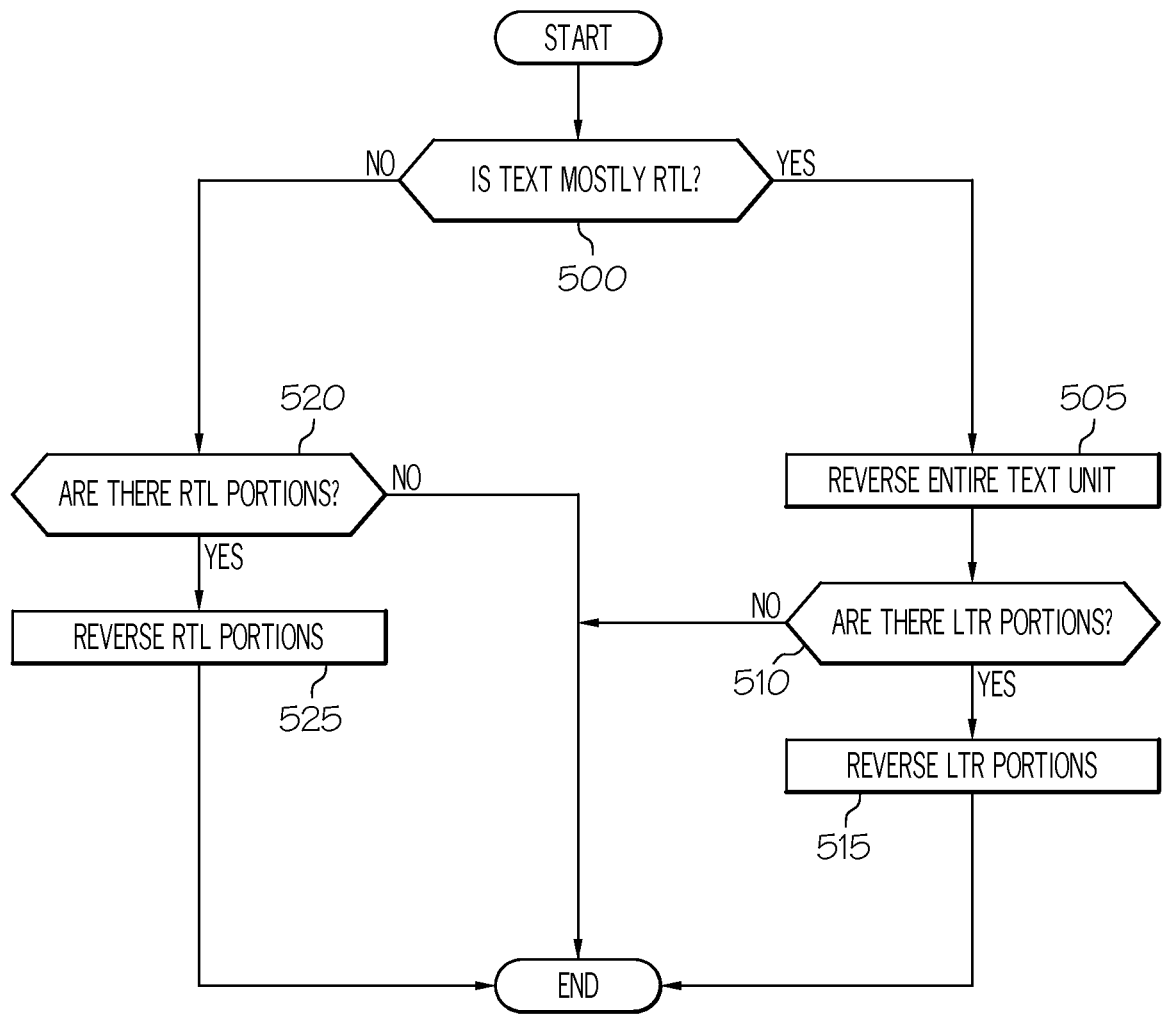
FIG. 5 is a flowchart showing an illustrative method for correcting extracted characters or text segments that are in reverse logical order, according to one embodiment of principles described herein.

FIG. 5 is a flowchart showing an illustrative method for correcting extracted text that is reverse logical order. The reverse component (115) uses a result received from the order identifier (110). In the example herein, the reverse component (115) uses one or more results indicating whether there is text having an LtR logical order, text having an RtL logical order, whether a logical order is reversed in the extracted text, and an indication of the number of occurrences of text having an LtR logical order and text having an RtL logical order.

At determination 500, the reverse component (115) uses the one or more results to determine whether the logical ordering is predominantly RtL (e.g. by using an indication that there is text having an RtL logical order and an indication of the number of occurrences of text having an LtR logical order and text having an RtL logical order).

In the first example, the reverse component (115) determines that there is text having an RtL logical order, that there is one occurrence of text having an LtR logical order (e.g. the first punctuation character) and two occurrences of text having an RtL logical order (e.g. the second punctuation character and the commonly occurring word "eht"). In the first example, the reverse component (115) determines that the logical ordering is predominantly RtL and reverses (step 505) one or more text portions of the extracted text.

In one illustrative embodiment, the reverse component (115) receives ordering data identifying various text segments as having correct or reversed ordering. By way of example and not limitation, the ordering information may specify that the lines of a document are in a correct logical order, but the text within each line is in reverse order. The reverse component (115) will then leave the large scale order of the lines unchanged and reverse each line one at a time. Thus, in response to the reversal, the text will read correctly from top to bottom.

It should be understood that any size of text segment can be identified as reversed (e.g. pages, lines, paragraphs, or single words). In the first example, the result of reversal is shown below:

the cats eat some food. .retaw knird swoc

At determination 510, the reverse component (115) uses the one or more results to determine whether there is any text having an LtR logical order. If the reverse component (115) determines that there is not any text having an LtR logical order, the process of FIG. 5 ends and the extracted text preparation is complete.

If the reverse component (115) determines that there is text having an LtR logical order, the reverse component (115) determines one or more text portions having an LtR logical order. Typically, a character has, as well as a character encoding, a property associated with direction (that is, a logical order). Typically, a space character has a property of "neutral" indicating that it does not have an RtL logical order or an LtR logical order.

According to one illustrative embodiment, the reverse component (115) processes the extracted text and looks up the property of each character in order to determine an associated logical order. In the first example, characters of the extracted text and associated properties are shown below, where "r" indicates an RtL logical order; "l" indicates an LtR logical order and "n" indicates neutral:

--- the cats eat some food. .retaw knird swoc
rrrnrrrrnrrrnrrrrnrrrrrnlllllnlllllnllll

---

In the first example, the reverse component (115) determines that there are three text portions having an LtR logical order. In response, the reverse component (115) reverses the text portions having an LtR logical order (step 515). According to one illustrative embodiment, an entire portion comprising the three text portions is reversed (including characters having a neutral property within the three text portions). However, a character having a neutral property at a boundary (e.g. beginning or end) of the entire portion is not reversed. For example, the space character indicated with an underline below, is not reversed:

food._.retaw

In the first example, the result of reversal is shown below: the cats eat some food. cows drink water.

Following the reversal of LtR portions in step 515, the process of FIG. 5 ends and the extracted text preparation is complete.

For example, if text having an RtL logical order is predominant in the extracted text, executing a bulk reversal of the text at step 505 corrects the reversal of the majority of text in a single execution. By correcting the reversal of some (i.e. a minority of) text portions having an LtR logical order after this bulk reversal, efficiency is improved.

If the reverse component (115) determines that the logical ordering is not predominantly RtL at determination 520, the reverse component (115) uses the one or more results to determine whether there is any text having an RtL logical order.

If the reverse component (115) determines that there is not any text having an RtL logical order, the process of FIG. 5 ends and preparation of the extracted text is complete. The processed text can be sent to one or more tools e.g. for analysis.

If the reverse component (115) determines that there is text having an RtL logical order, the reverse component (115) determines one or more text portions having an RtL logical order (e.g. by analyzing a property associated with direction of a character). In response, the reverse component (115) reverses (step 525) the text portions having an RtL logical order. If the reverse component (115) determines that there is not any text having an RtL logical order, the process of FIG. 5 ends and the extracted text preparation is complete. The processed text can be sent to one or more tools e.g. for analysis. For example, if text having an RtL logical order is not predominant in the extracted text, a reversal of some (i.e. a minority of) text portions having an RtL logical order is executed, thus improving efficiency.

It should be understood that if the extracted text is processed in an RtL order, one or more modifications are made. For example, a second set of rules is used as a logical order specified in the set of rules described above will be incorrect. For example, if the following types of characters are determined, an associated logical order is LtR rather than RtL:

[space character] [punctuation character] [alphabetical character]

Further modifications can be made e.g. wherein a word is stored in a dictionary in an RtL logical order and reversed logical order.

In sum, the apparatus of the present specification receives an input document and extracts the text it contains. The apparatus then analyzes the language of the text, the logical order the text is currently presented in, and then alters the order as required for more efficient post analysis. For example, the apparatus of the present specification is operable to handle a document comprising bidirectional text (for example, text having an RtL logical order and text having an LtR logical order) and documents containing text in two or more languages. Additionally, by using a plurality of mechanisms associated with heuristics and by using a confidence threshold, the robustness of results generated by the apparatus of the present specification can be improved. For example, the apparatus of the present specification may be used with a variety of document formats. For example, a PDF file which stores text in LtR order for display may be used. In another example, a file which comprises a document that has been scanned and processed using optical character recognition (OCR) can be used. In another example, a file comprising markup (e.g. HTML) wherein the logical order of text is incorrectly specified or not specified can be used. Further, the apparatus of the present specification can be used in a number of applications. For example, in preparation of text for text analysis; in preparation of text for use by text processing systems (e.g. a word processing system), and in preparation of text for storage in text retrieval systems (e.g. a database or a content management system).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for preparing a display document for analysis comprising:
    extracting character data from said display document, wherein a language of said character data in said display document is unknown when said character data is extracted;
    determining a first order associated with processing of said character data and a second order associated with a logical order of said character data, including comparing said character data against a set of dictionaries to determine said second order based on a match between said character data and a word listed in a dictionary of said set of dictionaries, each dictionary corresponding to a particular language and listing words of that language, wherein comparing said character data against a set of dictionaries further comprises, if a first comparison of said character data to said dictionaries does not determine a language of said character data, reversing an order of said character data and making a second comparison of said reversed character data against said set of dictionaries;
    determining whether said first order is different from said second order; and
    reversing at least a portion of said character data in response to said determination that said first order is different from said second order.

2. The method of claim 1, further comprising:
    determining a commonly-occurring word in said character data;
    comparing said commonly-occurring word against a rule; and
    in response to said comparing step, determining said second order.

3. The method of claim 1, further comprising:
    selecting a dictionary from said set for comparing said character data based on a previously-determined indicator of a language of said character data to increase a speed at which a matching dictionary is identified from the set of dictionaries.

4. The method of claim 3, further comprising determining a language of said character data based on said comparison to said set of dictionaries and determining said second order based on said determined language of said character data.

5. The method of claim 1, further comprising:
    identifying at least one language associated with said character data in said document.

6. The method of claim 5, further comprising analyzing at least one of: vocabulary associated with said character data; at least one character encoding associated with said character data and script data associated with a script of said character data.

7. The method of claim 5, further comprising using said identified language for determining a rule against which to compare said character data in said document, in order to determine said second order.

8. The method of claim 7, wherein at least one of said language identifier and said order identifier is operable to generate a confidence value associated with at least one of: said identified language and said determined second order.

9. The method of claim 8, further comprising comparing said confidence value against a confidence threshold.

10. The method of claim 1, further comprising determining whether said character data in said document has a predominant first order.

11. The method of claim 1, further comprising:
    determining whether individual subsets of said character data have a different respective first order; and
    reversing at least one of said subsets according to said second order.

12. The method of claim 1, further comprising merging results from two or more different analyses to identify a language of said character data.

13. A method for preparing a display document for analysis comprising:
    extracting character data from said display document, wherein a language of said character data in said display document is unknown when said character data is extracted;
    determining a first order associated with processing of said character data and a second order associated with a logical order of said character data;
    determining whether said first order is different from said second order; and
    reversing at least a portion of said character data in response to said determination that said first order is different from said second order;
    wherein determining the second order comprises identifying a punctuation character that is position dependent such that a space character will appear on only one side of the punctuation character, where the side of the punctuation character on which the space character appears depends on said second order; and
    comparing characters around said punctuation character data against a rule to determine said second order.

14. The method of claim 13, wherein said second order is determined by identifying, in said character data, a full stop character and then determining on which side of said full stop character a space character appears.

15. An apparatus for preparing a display document for analysis comprising a processor implementing:
    an extractor for extracting character data from said display document, wherein the character data comprises image data representing an image of a number of characters without including character codes;
    an order identifier for determining a first order associated with processing of said character data and a second order associated with a logical order of said character data, and for determining whether said first order is different from said second order, wherein determining the second order comprises identifying a punctuation character that is position dependent such that a space character will appear on only one side of the punctuation character, where the side of the punctuation character on which the space character appears depends on said second order; and a reverse component for reversing at least a portion of said character data, responsive to said order identifier determining that said first order is different from said second order.

16. The apparatus of claim 15, wherein said order identifier is configured to:
   determine position dependent character data, wherein said position dependent character data comprises at least one of: a punctuation character and presentation data;
   compare said position dependent character data against a rule; and
   in response to said comparison, determine said second order.

17. The apparatus of claim 15, wherein said order identifier is configured to:
   determine a commonly-occurring word in said character data;
   compare said commonly-occurring word against a rule; and
   in response to said comparison, determine said second order.

18. The apparatus of claim 15, wherein said order identifier is configured to compare said character data against a set of dictionaries in order to determine said second order.

19. The apparatus of claim 15, further comprising a language identifier for identifying at least one language associated with said character data in said document, wherein said language identifier is configured to analyze at least one of: vocabulary associated with said character data; at least one character encoding associated with said character data, and script data associated with a script of said character data.

20. The apparatus of claim 19, wherein said order identifier is configured to use said identified language for determining a rule against which to compare said character data in said document, in order to determine said second order.

21. The apparatus of claim 20, wherein said language identifier and said order identifier are configured to generate a confidence value associated with at least one of: said identified language and said determined second order.

22. A computer program product for preparing a Portable Document Format (PDF) document for analysis, the computer program product comprising:
   a non-transitory computer usable storage medium having computer usable program code embodied therewith, the computer usable program code comprising:
   non-transitory computer usable program code configured to extract character data from said PDF document, wherein a language of said character data in said PDF document is unknown when said character data is extracted;
   non-transitory computer usable program code configured to determine a first order associated with processing of said character data and a second order associated with a logical order of said character data, including comparing said character data against a set of dictionaries to determine said second order based on a match between said character data and a word listed in a dictionary of said set of dictionaries, each dictionary corresponding to a particular language and listing words of that language, wherein comparing said character data against a set of dictionaries further comprises, if a first comparison of said character data to said dictionaries does not determine a language of said character data, reversing an order of said character data and making a second comparison of said reversed character data against said set of dictionaries;
   non-transitory computer usable program code configured to determine whether said first order is different from said second order; and
   non-transitory computer usable program code configured to reverse said character data in response to a determination that said first order is different from said second order.

23. An apparatus for preparing a display document for analysis comprising a processor implementing:
   an extractor to extract character data from said display document, wherein a language of said character data in said display document is unknown when said character data is extracted;
   an order identifier to determine a first order associated with processing of said character data and a second order associated with a logical order of said character data, including comparing said character data against a set of dictionaries to determine said second order based on a match between said character data and a word listed in a dictionary of said set of dictionaries, each dictionary corresponding to a particular language and listing words of that language, wherein comparing said character data against a set of dictionaries further comprises, if a first comparison of said character data to said dictionaries does not determine a language of said character data, reversing an order of said character data and making a second comparison of said reversed character data against said set of dictionaries; and
   a reverse component for reversing at least a portion of said character data, responsive to said order identifier determining that said first order is different from said second order.

* * * * *